United States Patent
Ka-wah et al.

(10) Patent No.: US 6,792,243 B2
(45) Date of Patent: Sep. 14, 2004

(54) ELECTRONIC BOOK WITH SIMULATED THREE-DIMENSIONAL ILLUSTRATIONS

(75) Inventors: Chi Chow Ka-wah, New Territories (HK); Frederick Tsang Lam-tak, New Territories (HK)

(73) Assignee: VTech Electronics Limited, Tai Po (HK)

(*) Notice: Subject to any disclaimer, the term of this patent is extended or adjusted under 35 U.S.C. 154(b) by 485 days.

(21) Appl. No.: 09/742,643

(22) Filed: Dec. 21, 2000

(65) Prior Publication Data

US 2002/0081560 A1 Jun. 27, 2002

(51) Int. Cl.[7] .................................................. G09B 5/00
(52) U.S. Cl. ..................... 434/317; 434/308; 434/309; 434/365
(58) Field of Search ................................ 434/118, 156, 434/307 R, 308, 309, 317, 319, 327, 330, 339, 349, 365; 40/124.03, 544, 455; 446/73; 281/15.1, 31, 51, 63.1; 345/1.1, 173, 87, 672, 901

(56) References Cited

U.S. PATENT DOCUMENTS

| | | | | |
|---|---|---|---|---|
| 4,703,573 A | * | 11/1987 | Montgomery et al. | ... 40/124.03 |
| 4,990,092 A | * | 2/1991 | Cummings | .................... 40/455 |
| 5,096,204 A | | 3/1992 | Lippman | |
| 5,356,296 A | * | 10/1994 | Pierce et al. | ................. 434/317 |
| 5,419,705 A | * | 5/1995 | Sandvik | ....................... 434/317 |
| 5,533,757 A | * | 7/1996 | Lebby et al. | ................ 345/672 |
| 5,558,520 A | * | 9/1996 | Werzberger | .................. 434/317 |
| 5,644,516 A | * | 7/1997 | Podwalny et al. | ........... 345/901 |
| 5,681,199 A | * | 10/1997 | Morris | ....................... 281/15.1 |
| 5,823,532 A | | 10/1998 | Goldwasser et al. | |
| 5,954,514 A | * | 9/1999 | Haas et al. | .................. 434/308 |
| 6,072,980 A | * | 6/2000 | Manico et al. | ................. 281/31 |
| 6,167,233 A | * | 12/2000 | Gresser et al. | .............. 434/308 |
| 6,229,502 B1 | * | 5/2001 | Schwab | ....................... 345/1.1 |
| 2001/0018809 A1 | * | 9/2001 | Heropoulos et al. | .......... 40/544 |
| 2001/0051329 A1 | * | 12/2001 | Lynch et al. | ................. 434/317 |

* cited by examiner

*Primary Examiner*—Joe H. Cheng
(74) *Attorney, Agent, or Firm*—Greenberg Traurig, P.C.

(57) ABSTRACT

The present invention is directed to a book device corresponding to at least one narrative story, including a spine, at least three pages pivotably connected to the spine, a sound producing apparatus, and a plurality of switch elements which activate the sound producing apparatus to play desired audio segments corresponding to a particular story element. Each of the pages contains illustrative material, such as text and/or pictures, and at least one of the pages is partially transparent, so that illustrative material on subsequent pages is visible to the reader through the transparent portion of the page. In another embodiment, the illustrative material is not affixed to the pages themselves, but takes the form of inserts which may be removed and interchanged, with the book device able to determine which story corresponds to the particular inserts being used and play the desired audio segments corresponding to that story.

4 Claims, 3 Drawing Sheets

ELECTRONIC BOOK WITH SIMULATED THREE-DIMENSIONAL ILLUSTRATIONS

BACKGROUND OF THE INVENTION

1. Field of the Invention

The present invention relates to children's books with electronic sound effects and, more particularly, to an electronic book in which visual elements on separate pages combine to form a picture which simulates a three-dimensional view.

2. Background Art

The combination of books with electronic sound effects is well known in the art. In particular, many books have included a sound-producing mechanism which is triggered by turning of the pages, and which plays audio segments which correspond with the narrative and pictures on the pages. These segments have included narration, music, and sound effects, among others. The means for producing such sound effects typically involves a battery-powered system involving a microprocessor and a speaker housed within the structure of the book itself.

The use of structures to produce three-dimensional images is also known. For instance, Lippmann, U.S. Pat. No. 5,096,204, discloses an apparatus made of individual leaves in which the two-dimensional shape of the leaves varies from one leaf to another so that the closed apparatus is in the form of a distinct three-dimensional structure. Such apparatus are limited, however, in that they are able to present only one story which is predetermined by the shapes of the individual pages and their configurations. In addition, the apparatus of the Lippmann '204 patent is a strictly visual or tactile device.

It would be desirable to provide a book-like apparatus in which each page has a substantially uniform two-dimensional shape, in which the reader is able to see a three-dimensional image due to the interplay of visual elements on separate pages.

It would also be desirable to provide a book-like apparatus in which the three-dimensional nature of the images is combined with electronic sound effects.

It would also be desirable to provide a book-like apparatus which is capable of displaying simulated three-dimensional images, while also being able to present story elements in an audible fashion, wherein a plurality of pages with corresponding different three-dimensional images are provided, and the respective images correspond to distinct audible story elements.

It would also be desirable to provide a book-like apparatus with three-dimensional images and electronic sound effects in which the reader is able to choose from among a number of stories.

These and other desirable characteristics of the present invention will become apparent in view of the present description, claims, and drawings.

SUMMARY OF THE INVENTION

The present invention is directed to a book device for presenting visual and audible indicia corresponding to at least one narrative story, comprising a substantially hollow spine structure, at least three page members pivotably connected to the substantially hollow spine structure, a sound producing apparatus, a plurality of switch elements, and visible indicia corresponding to the at least three page members. The sound producing apparatus is operably disposed in the substantially hollow spine structure and configured to annunciate audible indicia corresponding to portions of at least one narrative story, the portions of the story being annunciated being dependent upon the respective positions of the at least three page members relative to the hollow spine structure. The plurality of switch elements operably interconnect the at least three page members to the substantially hollow spine structure and the sound producing means, and are operably configured to communicate to the sound producing means the respective positions of the at least three page members relative to the hollow spine is structure. The visible indicia corresponding to the at least three page members correspond also to portions of the at least one narrative story, and at least two of the at least three page members have opposite sides with indicia visible on each.

Further, at least one of the pages is at least partially transparent, so that when the at least one page is disposed in overlying relation to another of the at least two other pages, at least some of the indicia of the underlying page is visible through the at least one partially transparent page. Also, the indicia on the respective pages are operably arranged so that for each possible respective orientation of the at least three pages relative to each other and the substantially hollow spine member, the indicia visible to an operator bear a corresponding relationship to the particular portion of the at least one narrative story, represented by the audible indicia annunciated by the sound producing apparatus.

In another embodiment of the invention, the sound producing apparatus comprises an electronic microprocessor-controlled apparatus containing data stored in memory corresponding to the audible indicia corresponding, in turn, to the portions of at least one narrative story.

In a further embodiment of the invention, the plurality of switch elements are operably configured to cause a signal to be generated and transmitted to the electronic microprocessor-controlled apparatus, once the book device has been activated, indicative of a change in the respective orientation of the at least three pages, so as to cause the appropriate audible indicia, corresponding to the particular page orientation, to be annunciated.

In another preferred embodiment, the visible indicia on the pages are removable from the pages, and interchangeable, as a set, with at least one other set of indicia, and the sound producing apparatus is operably configured to produce audible indicia corresponding to at least two narrative stories.

DETAILED DESCRIPTION OF THE INVENTION

Figure 1:
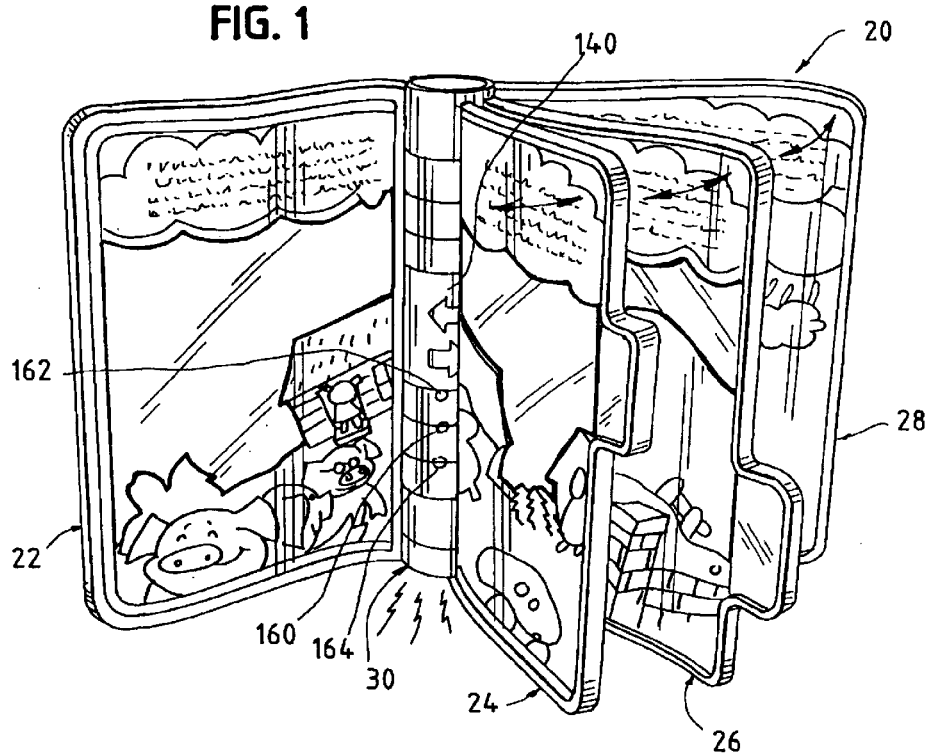
FIG. 1 is a perspective view of an electronic book with simulated three-dimensional illustrations according to a preferred embodiment of the present invention, showing the book in its open orientation and the pages thereof.

While this invention is susceptible of embodiment in many different forms, there is shown in the drawings, and will herein be described in detail, one specific embodiment, with the understanding that the present disclosure can be considered as an exemplification of the principles of the invention and is not intended to limit the invention to the embodiments illustrated.

Electronic book with simulated three-dimensional illustrations 20 is shown in FIGS. 1–7 as comprising first page 22, second page 24, third page 26, end page 28, and spine 30. While the particular embodiment described herein contains only three pages and an end page, it is contemplated that fewer or more pages may be used as are necessary and desirable to fully set forth the story or stories which are chosen. The number of pages is limited somewhat by the nature of the three-dimensional effect presented by the illustrations, as described below, but it is certainly contemplated that the invention may take a form involving more or less than three pages.

In addition, electronic book 20 contains a sound-producing device (not shown) which is enabled by the opening and closing of first page 22, second page 24, and third page 26, as described below. Typically, this will take the form of a battery-powered electronic element, along with some type of speaker element, as would be known to those of ordinary skill in the art. In this embodiment, the mechanism used for activating the sound-producing device is substantially similar to that found in VTech Electronics Limited's Little Smart Storytime Rhymes product, as displayed in the dimensional 1998 VTech Electronics catalog. In particular, this mechanism consists of a plurality of switches located within spine 30, which are activated by the opening of the pages, as described below, and which send an electronic signal to the sound-producing device that indicates the orientation of the pages. The sound-producing device then produces an audio segment which corresponds to the particular orientation of the pages, as further described below.

Figure 4:
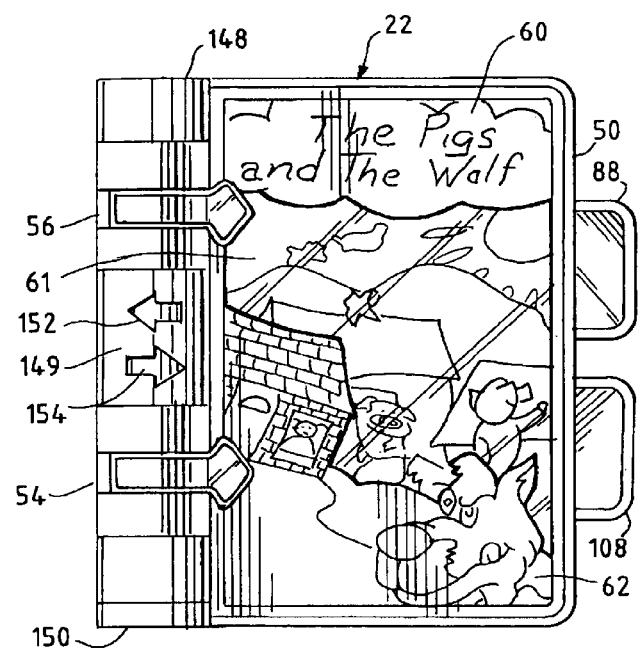
FIG. 4 is a front elevational view of the electronic book with simulated three-dimensional illustrations shown in FIG. 1, showing the first page of the book when the book is closed.
Figure 5:
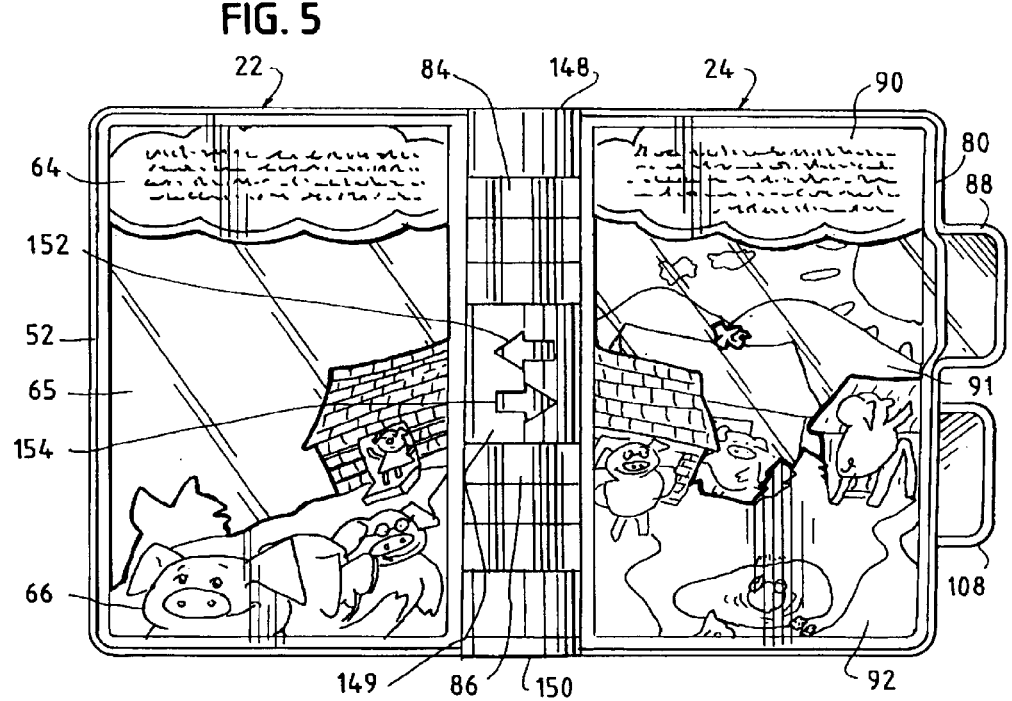
FIG. 5 is a front elevational view of the electronic book with simulated three-dimensional illustrations shown in FIG. 1, showing the first and second pages of the book after the first page has been opened.

First page 22 is shown in FIGS. 4 and 5 as including front portion 50, rear portion 52, first connecting member 54, and second connecting member 56. First page 22, second page 24, and third page 26 are preferably substantially or entirely constructed of a transparent material such as clear plastic. As shown in FIG. 1, front portion 50 includes first text element 60, transparent portion 61, and first picture element 62. First text element 60 and first picture element 62 are preferably substantially or completely opaque and include text and pictures, respectively. First text element 60 and first picture element 62 may be in the form of text or illustrations on paper, plastic, or other material known to those of ordinary skill in the art which are affixed to first page 22 by means of glue or other adhesive, or they may also take the form of ink, paint, or other illustrative materials applied directly on first page 22.

When electronic book 20 is closed, the reader is able to look through transparent portion 61 of front portion 50 of first page 22 to see visual elements on second page 24, third page 26, and end page 28 which are not obstructed by opaque sections on prior pages. As a result, the portions of each page which are visible to the reader combine to form a simulated three-dimensional image, with visual elements on first page 22 appearing to be in the foreground and visual elements on later pages appearing to be progressively farther away. This effect provides the reader with a sense of perspective relating the various visual and story elements.

In this embodiment, first text element 60 indicates the title of the story and first picture element 62 provides an introductory scene showing certain of the characters and/or locations involved in the story. First text element 60 and first picture elements 62 are shown as separate elements, with first text element 60 being located at the top of front portion 50 of first page 22 and first picture element 62 being located at the bottom of front portion 50. However, it is certainly contemplated that first text element 60 and first picture element 62 may be interchanged, or combined into a single element so as to provide a larger transparent portion 61.

Figure 2:
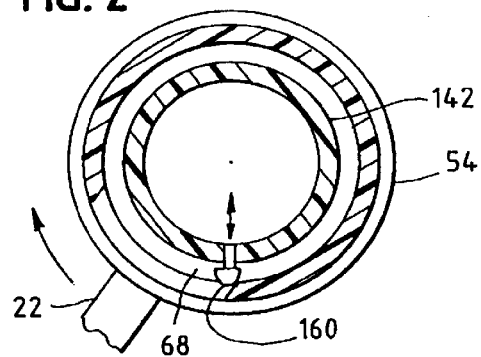
FIG. 2 is a cross-sectional view of the spine portion of the electronic book with simulated three-dimensional illustrations of FIG. 1, showing the flange element of the first connecting member of the first page interacting with the first button element of the inner portion of the spine, which enables the desired sound effects corresponding with the opening of the first page by the reader, and actuation of the appropriate button or switch, if necessary.
Figure 3:
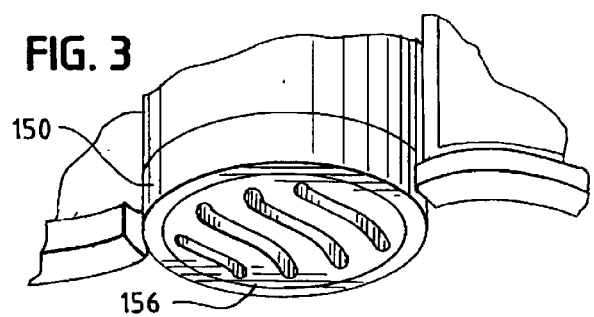
FIG. 3 is a perspective view of the bottom portion of the spine portion of the electronic book with simulated three-dimensional illustrations shown in FIG. 1, showing the speaker associated with the sound effects enabled or activated by the turning of the pages by the reader.

Spine 30 includes outer portion 140 and inner portion 142, as shown in FIGS. 1 and 2. Outer portion 140, as shown in FIGS. 4–7, further includes top portion 148, center portion 149, and bottom portion 150. Center portion 149 includes first button 152 and second button 154, which in this embodiment are in the shape of arrows pointing to the left and the right, respectively. Other shapes may be employed if desired. Bottom portion 150 includes speaker 156, as shown in FIG. 3. Speaker 156 is an element of the sound-producing device described above. Inner portion 142 further includes first switch member 160, second switch member 162, and third switch member 164, as shown in FIG. 1.

First page 22 is hingably connected to spine 30 by means of first connecting member 54 and second connecting member 56. In the preferred embodiment, first and second connecting members 54 and 56 take the form of circular elements which surround inner portion 142 of spine 30 and are configured to be able to rotate about spine 30 such that first page 22 rotates about spine 30 when turned by the reader. In addition, first and second connecting members 54 and 56 are substantially circular and of the same diameter as outer portion 140 of spine 30, so that the outer surfaces of outer portion 140 and first and second connecting members 54 and 56 are aligned with one another.

First connecting member 54 further includes flange element 68, which protrudes from the inner surface of first connecting member 54, as shown in FIG. 2. Flange element 68 consists of a raised portion extending along a portion of the circumference of the inner surface of first connecting member 54 which engages first switch member 160 when first page 22 is opened or closed by the reader. When first page 22 is opened, flange element 68 depresses first switch member 160 and continues to hold it in the depressed position until first page 22 is returned to the closed position, at which point first switch member 160 is allowed to return to its original undepressed position. In the preferred embodiment, first switch member 160 is a transient switch which activates the desired sound effects corresponding to the opening and closing of first page 22, as further described below.

In operation, the reader opens electronic book 20 by turning first page 22 about spine 30, so that rear portion 52 of first page 22 is now visible, as shown in FIG. 5. Rear portion 52, as shown in FIG. 5, includes second text element 64, transparent portion 65, and second picture element 66. Second text element 64 provides an element of the narrative of the story, and second picture element 66 provides a scene corresponding with the narrative provided in second text element 64. Second text element 64 and second picture element 66 are opaque and substantially or completely correspond in size, shape, and placement to first text element 60 and first picture element 62, respectively, on front portion 50 of first page 22. As a result, the reader looking at rear portion 52 of first page 22 will see second text element 64 and second picture element 66 and will not see the reverse sides of first text element 60 and first picture element 62, which are covered by second text element 64 and second picture element 66, respectively. Thus, transparent portion 65 will have the same size and shape as transparent portion 61 of front portion 50.

Figure 6:
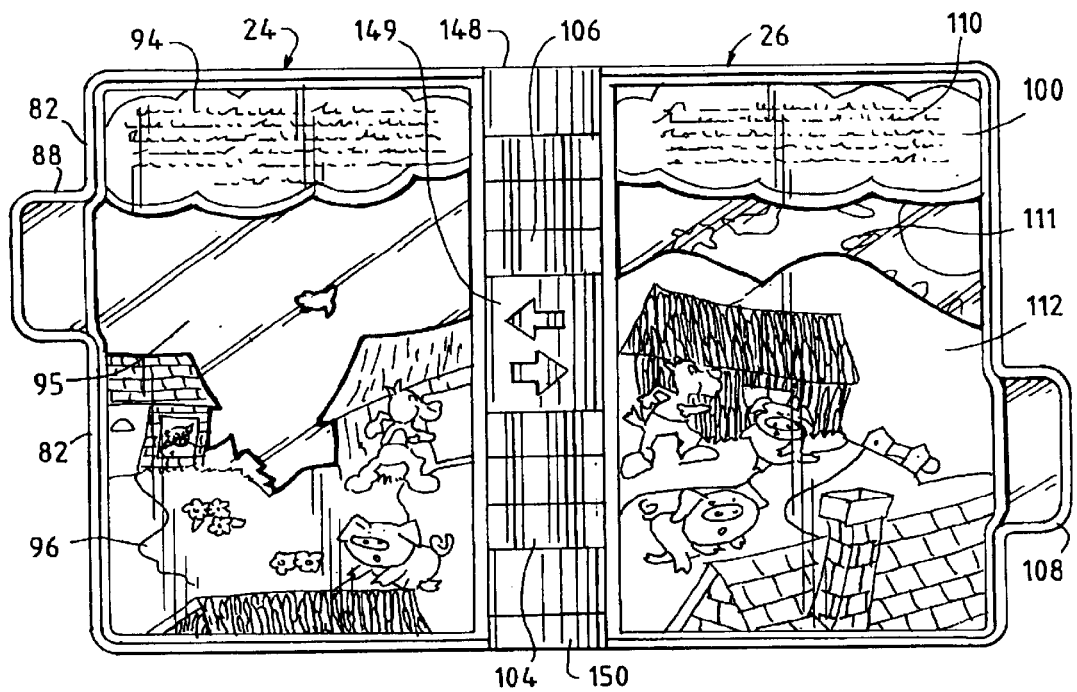
FIG. 6 is a front elevational view of the electronic book with simulated three-dimensional illustrations shown in FIG. 1, showing the second and third pages of the book after the second page has been opened.

After opening first page 22, the reader is then able to see story elements on both first page 22 and second page 24, as shown in FIG. 5. Second page 24 is shown in FIGS. 5 and 6 as including front portion 80, rear portion 82, first connecting member 84, second connecting member 86, and tab member 88. Like first connecting member 54 and second connecting member 56 of first page 22, first connecting member 84 and second connecting member 86 take the form of circular elements which surround inner portion 142 of spine 30 and rotate about spine 30 such that second page 24 rotates about spine 30 as well. First and second connecting members 84 and 86 are also of the same diameter as outer portion 140 of spine 30 and are aligned with outer portion 140 of spine 30 and first and second connecting members 54 and 56 of first page 22. First connecting member 84 further includes a flange element (not shown), which protrudes from the inner surface of first connecting member 84, similar to flange element 68 on first connecting member 54 of first page 22. This flange element is positioned such that it engages second switch member 162 of spine 30 when second page 24 is opened or closed by the reader. Preferably, second switch member 162 is a transient switch which activates the desired sound effects corresponding to the opening and closing of second page 24 in a similar fashion as first switch member 160, described above.

Tab member 88 is shown in FIG. 5 as a rectangular extension protruding from the right edge of second page 24 and of the same thickness as second page 24, although it may take on one of any number of different shapes and depths as desired. Tab member 88 facilitates turning of second page 24 by the reader. This is particularly useful for small children who may otherwise have difficulty in separating the pages. While in this embodiment tab member 88 is constructed of the same material as second page 24, it is contemplated that tab member 88 may also consist of a separate material so as to provide contrast with second page 24.

As shown in FIG. 5, front portion 80 of second page 24 includes third text element 90, transparent portion 91, and third picture element 92. Third text element 90 provides the next element of the narrative of the story and third picture element 92 provides a scene corresponding with the narrative provided in third text element 92. Therefore, after opening first page 22, the reader is then able to see second text and picture elements 64 and 66 and third text and picture elements 90 and 92 simultaneously. In addition, the reader is also able to look through transparent portion 91 to see the same or more visual elements on third page 26 and end page 28 than were visible through transparent portion 61 of front portion 50 of first page 22. Thus, the reader is still able to see a simulated three-dimensional image with visual elements on second page 24 appearing to be in the foreground and visual elements on later pages appearing to be farther away. However, the visual elements on later pages appear to be slightly closer to the foreground than they did when the reader viewed them through transparent portion 61 of front portion 50 of first page 22, because one layer of visual elements is no longer present. Additionally, as one gets farther into the book, more and more of the latter pages may be successively revealed, creating a changing visual background context.

Opening second page 24 will reveal rear portion 82 of second page 24, as shown in FIG. 6. Rear portion 82 includes fourth text element 94, transparent portion 95, and fourth picture element 96. Fourth text element 94 provides the next element of the narrative of the story, and fourth picture element 96 provides a scene corresponding with the narrative provided in fourth text element 94. Fourth text element 94 and fourth picture element 96 are opaque and substantially or completely correspond in size, shape, and placement to third text element 90 and third picture element 92, respectively, on front portion 80 of second page 24. As a result, the reader looking at rear portion 82 of second page 24 will see only fourth text element 94 and fourth picture element 96, and will not see the reverse sides of third text element 90 and third picture element 92. Thus, transparent portion 95 will typically have the same general size and shape as transparent portion 91 of front portion 80 of second page 24. Certain portions of second picture element 66 may be visible through transparent portion 95 as well, if desired.

Figure 7:
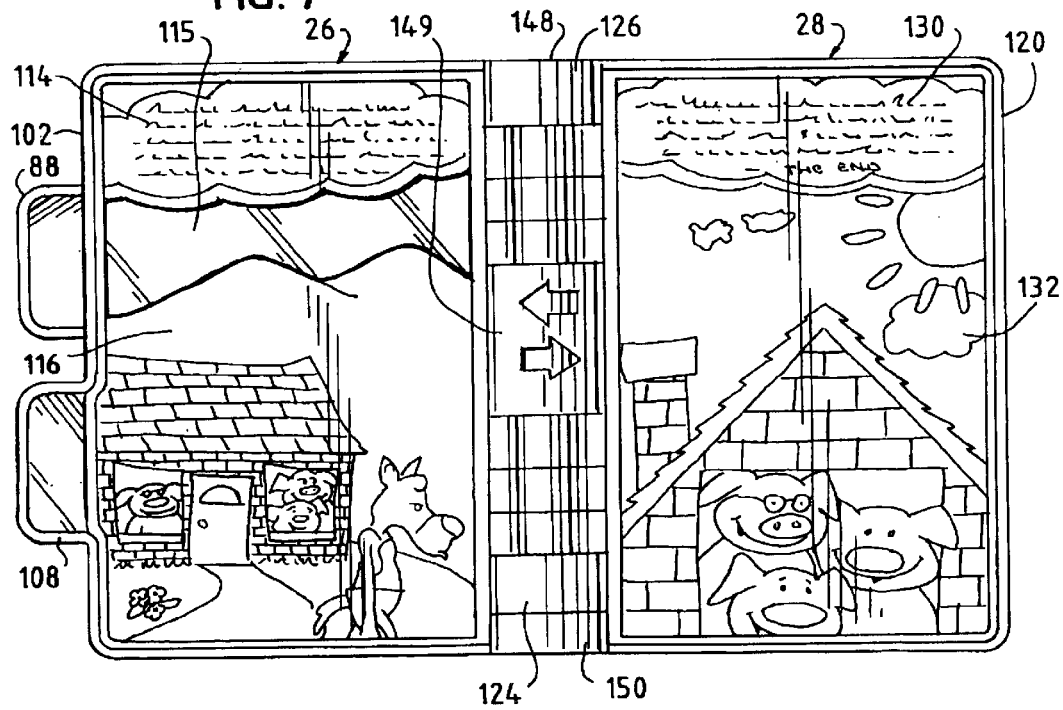
FIG. 7 is a front elevational view of the electronic book with simulated three-dimensional illustrations shown in FIG. 1, showing the third and end pages of the book after the third page has been opened.

After opening second page 24, the reader is then able to see story elements on both second page 24 and third page 26, as shown in FIG. 6. Third page 26 is shown in FIGS. 6 and 7 as including front portion 100, rear portion 102, first connecting member 104, second connecting member 106, and tab member 108. Like first connecting members 54 and 84 and second connecting members 56 and 86 of first page 22 and second page 24, respectively, first connecting member 104 and second connecting member 106 take the form of circular elements which surround inner portion 142 of spine 30 and rotate about spine 30 such that third page 26 rotates about spine 30 as well. First and second connecting members 104 and 106 are also of the same diameter as outer portion 140 of spine 30 and are aligned with outer portion 140 of spine 30 and first connecting members 54 and 84 and second connecting members 56 and 86 of first page 22 and second page 24, respectively. First connecting member 104 further includes a flange element (not shown), which protrudes from the inner surface of first connecting member 104, similar to flange element 68 of first connecting member 54 of first page 22. This flange element is positioned such that it engages third switch member 166 of spine 30 when third page 26 is opened or closed by the reader.

Like tab member 88 of second page 24, tab member 108 is shown in FIGS. 4 through 7 as a rectangular extension protruding from the right edge of third page 24 of the same thickness as third page 24, but may take on one of any number of different shapes and depths as desired.

As shown in FIG. 6, front portion 100 includes fifth text element 110, transparent portion 111, and fifth picture element 112. Fifth text element 110 provides the next element of the story narrative and fifth picture element 112 provides a scene corresponding with the narrative provided in fifth text element 110. After opening second page 24, the reader is then able to see fourth text and picture elements 94 and 96 and fifth text and picture elements 110 and 112 simultaneously. In addition, the reader is also able to look through transparent portion 111 of front portion 100 to see the same or more visual elements on end page 28 than were visible through transparent portions 61 and 91 of front portions 50 and 80 of first page 22 and second page 24, respectively. Thus, the reader is still able to see a simulated three-dimensional image with visual elements on third page 26 appearing to be in the foreground and visual elements on end page 28 appearing to be farther away.

Opening third page 26 will reveal rear portion 102 of third page 26, as shown in FIG. 7. Rear portion 102 includes sixth text element 114, transparent portion 115, and sixth picture element 116. Sixth text element 114 provides the next element of the narrative of the story, and sixth picture element 116 provides a scene corresponding with the narrative provided in sixth text element 114. Sixth text element 114 and sixth picture element 116, like the text and picture elements on rear portions 52 and 82 of first page 22 and second page 24 described above, are opaque and substantially or completely correspond in size, shape, and placement to fifth text element 110 and fifth picture element 112, respectively, on front portion 100 of third page 26. As a result, the reader looking at rear portion 102 of third page 26 will see only sixth text element 114 and sixth picture element 116, and will not see the reverse sides of fifth text element 110 and fifth picture element 112. Thus, transparent portion 115 will typically have the same general size and shape as transparent portion 111 of front portion 100 of third page 26. However, some of the other elements visible before the page is turned in fourth picture element 96 and second picture element 66 may still remain visible through transparent portion 115, if desired, but in a different context.

End page 28 includes front portion 120, rear portion (not shown), first connecting member 124, and second connecting member 126, as shown in FIG. 7. Front portion 120 includes seventh text element 130 and seventh picture element 132. Seventh text element 130 provides the final element of the narrative of the story, and seventh picture element 132 provides a scene corresponding with the narrative provided in seventh text element 130.

Like all of the previous pages, end page 28 is also hingably connected to spine 30 by means of first connecting member 124 and second connecting member 126, which take the form of circular elements surrounding inner portion 142 of spine 30 which rotate about spine 30. However, first connecting member 124 does not include a corresponding flange element, because in this embodiment there is no switch member on spine 30 which corresponds to the end page. However, a switch member corresponding to end page 28 is certainly contemplated if, for example, it is desired to provide an additional audio segment which corresponds with the closing of the book by the reader.

In this embodiment, there is no corresponding transparent portion on end page 28 because end page 28 is not allowed to rotate far enough to come into contact with front portion 50 of first page 22, and therefore the reader could not see any visual elements on other pages through such a transparency. However, it is contemplated that certain embodiments may allow end page 28 to rotate far enough so that it encounters front portion 50 of first page 22. In such an embodiment, it may be desirable to include a transparent portion on front portion 120 of end page 28 which would allow the reader to see text and picture elements on front portion 50 of first page 22.

While in this embodiment, the rear portion of end page 28 does not contain any text or picture elements, it is contemplated the rear portion may contain some type of text or illustration which provides some information about the story, as is often found on the rear cover of a children's book.

As described above, electronic book 20 contains a sound-producing device which is activated by the turning of the pages. Specific audio segments corresponding with each page are activated by opening that page. As the reader opens first page 22 to reveal rear portion 52 of first page 22 and front portion 80 of second page 24, flange element 68 of first connecting member 54 of first page 22 engages first switch member 160 of spine element 30, as shown in FIG. 2. When first switch member 160 is so engaged, it activates the means for producing sound, which produces a desired audio segment which corresponds to the narrative and picture elements shown in second text and picture elements 64 and 66 and third text and picture elements 90 and 92. This audio segment may consist of speech, music, sound effects, or any combination thereof as desired.

After the audio segment has concluded, the reader may replay portions thereof by pressing first button 152 and second button 154. First button 152, which is in the shape of a leftward-pointing arrow, will typically replay some portion of the audio segment corresponding with the narrative and picture elements shown in second text element 64 and second picture element 66, which are on the reader's left-hand side. Similarly, second button 154, which is in the shape of a rightward-pointing arrow, will typically replay some portion of the audio segment which corresponds with the narrative and picture elements shown in third text element 90 and fourth text element 92, which are on the reader's right-hand side.

In addition, it is contemplated that first button 152 and second button 154 can be used not merely to replay audio segments, but also to allow the reader to make choices which affect the current or subsequent audio segments. For example, the reader might be allowed to choose which of several characters in the story will narrate a particular audio segment, or to choose between music and narration. It is also contemplated that the visual text elements may be eliminated entirely and the narrative provided solely by the audio segments. This would make the story interactive, allowing the reader to make choices by means of first and second buttons 152 and 154 which would affect the development of the story on subsequent pages while using the same illustrations. For instance, the reader might be allowed to choose the outcome of the story from several possible alternatives. In such a case, different readings of the book could yield entirely different stories, adding to the reader's enjoyment.

As the reader opens second page 24 to reveal rear portion 82 of second page 24 and front portion 100 of third page 26, the flange element of first connecting member 84 of second page 24 engages second switch member 162 of spine element 30, in a similar fashion to that shown for first page 22 in FIG. 2. When second switch member 162 is so engaged, it activates the means for producing sound, in a manner similar to that described above for first page 22, to produce a desired audio segment which corresponds to the narrative and picture elements shown in fourth text and picture elements 94 and 96 and fifth text and picture elements 110 and 112. Similarly, first button 152 and second button 154 may be used to replay portions of the audio segment corresponding to fourth text and picture elements 94 and 96 and fifth text and picture elements 110 and 112, respectively.

Similarly, as the reader opens third page 26 to reveal rear portion 102 of third page 26 and front portion 120 of end page 28, the flange element of first connecting member 104 of third page 26 engages third switch member 164 of spine element 30. When third switch member 164 is engaged, it activates the means for producing sound, in a manner similar to that described above for first page 22 and second page 24, to produce a desired audio segment which corresponds to the narrative and picture elements shown in sixth text and picture elements 114 and 116 and seventh text and picture elements 130 and 132. Similarly, first button 152 and second button 154 may be used to replay portions of the audio segment corresponding to sixth text and picture elements 114 and 116 and seventh text and picture elements 130 and 132, respectively.

While in the first embodiment of the invention the visual elements are affixed to the transparent pages, in another embodiment the visual elements may constitute insert members which are separate from the pages and which are inserted into the pages by the reader. In such an embodiment, a single book can be used in conjunction with any number of different stories simply by the use of a corresponding insert member or set of insert members. Correspondingly, the pages themselves include a hollow interior portion into which the insert members can be inserted and an opening in at least one edge in order to accommodate the insert members. The number of insert members required for a particular story may be varied as desired, and may be less than or equal to the number of pages in the book itself. In addition, a combination of pages involving insert members and pages with visual elements affixed thereto can also be used.

In this embodiment, the electronic book with simulated three-dimensional illustrations further includes an indicator mechanism for producing the desired sound effects which correspond to the particular insert member or members being used. Such mechanisms, generally, are known in the art. This would allow the book to play individualized sound effects for each story corresponding to a particular insert member. When the reader inserts a particular insert member or set of insert members into the book, the indicator mechanism will determine which story corresponds to the particular insert member(s) in use. The sound-producing device will then play the particular sound effects which correspond with that story only.

The foregoing description and drawings are merely to explain and illustrate the inventions, and the inventions are not limited thereto except insofar as the independent claims are so limited, as those skilled in the art with the present disclosure before them will be able to make modifications and variations therein without departing from the scope of the invention.

What is claimed is:

1. An electronic book with simulated three-dimensional illustrations for presenting visual and audible indicia corresponding to at least one narrative story, comprising:

a substantially hollow spine structure;

at least three page members pivotably connected to the substantially hollow spine structure, wherein at least three of the at least three page members having visible indicia thereon corresponding to portions of at least one narrative story, at least two of the at least three page members having opposing sides and having indicia visible on each of the opposing sides, and at least one of the page members being at least partially transparent, so that when the at least one page member is overlaid the at least two other page members, at least some of the indicia of the underlying page member is visible through the at least one partially transparent page member;

a plurality of switch elements operably interconnecting the at least three page members to the substantially hollow spin structure and operably configured to communicate to a sound producing means the respective positions of the at least three page members relative to the substantially hollow spine structure; and the sound producing means operably disposed in the substantially hollow spine structure and configured to annunciate audible indicia corresponding to portion of the at least one narrative story, the annunciated portions of the narrative story being dependent upon the respective positions of the at least three page members relative to the substantially hollow spine structure;

wherein the indicia on the respective pages being operably arranged, so that for each possible respective orientation of the at least three page members relative to each other and the substantially hollow spine member, the indicia visible to a user bears a corresponding relationship to the particular portion of the at least one narrative story represented by the audible indicia annunciated by the sound producing means.

2. The book according to claim 1, wherein the sound producing means comprises an electronic microprocessor-controlled apparatus having memory means for storing data corresponding to the audible indicia relative to the portion of the at least one narrative story.

3. The book according to claim 2, wherein the plurality of switch elements are operably configured to cause a signal to be generated and transmitted to the electronic microprocessor-controlled apparatus, and wherein a change in the respective orientation of the at least three page members causes the appropriate audible indicia corresponding to the particular page orientation to be annunciated.

4. The book according to claim 1, wherein the indicia visible on the at least three page members as a set are removable and interchangeable with at least one other set of indicia, and wherein the sound producing means is operably configured to produce audible indicia corresponding to at least another one narrative story relative to the at least one other set of indicia.

* * * * *